US00RE46516E

(19) United States
(12) Reissued Patent
Bryant

(10) Patent Number: US RE46,516 E
(45) Date of Reissued Patent: Aug. 22, 2017

(54) WELL PACK LIGHT FIXTURE

(71) Applicant: Cooper Technologies Company, Houston, TX (US)

(72) Inventor: Christopher Michael Bryant, Social Circle, GA (US)

(73) Assignee: Cooper Technologies Company, Houston, TX (US)

(21) Appl. No.: 29/555,474

(22) Filed: Feb. 22, 2016

Related U.S. Patent Documents

Reissue of:
(64) Patent No.: Des. 668,810
Issued: Oct. 9, 2012
Appl. No.: 29/406,180
Filed: Nov. 10, 2011

U.S. Applications:
(63) Continuation of application No. 29/504,562, filed on Oct. 7, 2014, now Pat. No. Re. 45,893, which is an
(Continued)

(51) LOC (10) Cl. ..... 26-03
(52) U.S. Cl.
USPC ..... D26/85
(58) Field of Classification Search
USPC ..... D26/72, 85, 87, 92; 362/147, 404, 405, 362/406, 407, 408, 432
(Continued)

(56) References Cited

U.S. PATENT DOCUMENTS 2,732,484 A 1/1956 Lipscomb
3,047,716 A 7/1962 Hoxie et al.
(Continued)

OTHER PUBLICATIONS

Lighting Science; Wallpak ; product specification sheet; Nov. 2010.
(Continued)

*Primary Examiner* — Phillip S Hyder
(74) *Attorney, Agent, or Firm* — King & Spalding LLP

(57) CLAIM

The ornamental design for a wall pack light fixture, as shown and described.

DESCRIPTION

This application *is a continuation reissue application of and claims priority to U.S. patent application Ser. No. 29/504,562, filed on Oct. 7, 2014, and titled "Wall Pack Light Fixture," which is a reissue application of and claims priority to U.S. patent application Ser. No. 29/406,180, filed on Nov. 10, 2011, titled "Wall Pack Light Fixture," and issued as U.S. Pat. No. D668,810 on Oct. 9, 2012, which* is a continuation of and claims priority under 35 U.S.C. §120 to U.S. Design application Ser. No. 29/389,912, titled "Wall Pack Light Fixture" and filed Apr. 18, 2011, [the] *which issued as U.S. Pat. No. D650,112 on Dec. 6, 2011. The* entire contents of [which] *the foregoing applications* are hereby incorporated herein by reference.

*More than one reissue application has been filed for the reissue of U.S. Pat. No. D668,810. In addition to the present continuation reissue application, U.S. patent application Ser. No. 29/504,562 is a reissue application of U.S. Pat. No. D668,810.*

FIG. 1 is a perspective view of a wall pack light fixture, showing my new design;
FIG. 2 is another perspective view thereof;
FIG. 3 is a front view thereof;
FIG. 4 is a left side view thereof;
FIG. 5 is a right side view thereof;
FIG. 6 is a top plan view thereof; and,
FIG. 7 is a bottom plan view thereof.
The broken lines shown represent unclaimed subject matter and form no part of the claimed design.

1 Claim, 7 Drawing Sheets

Figure 3:
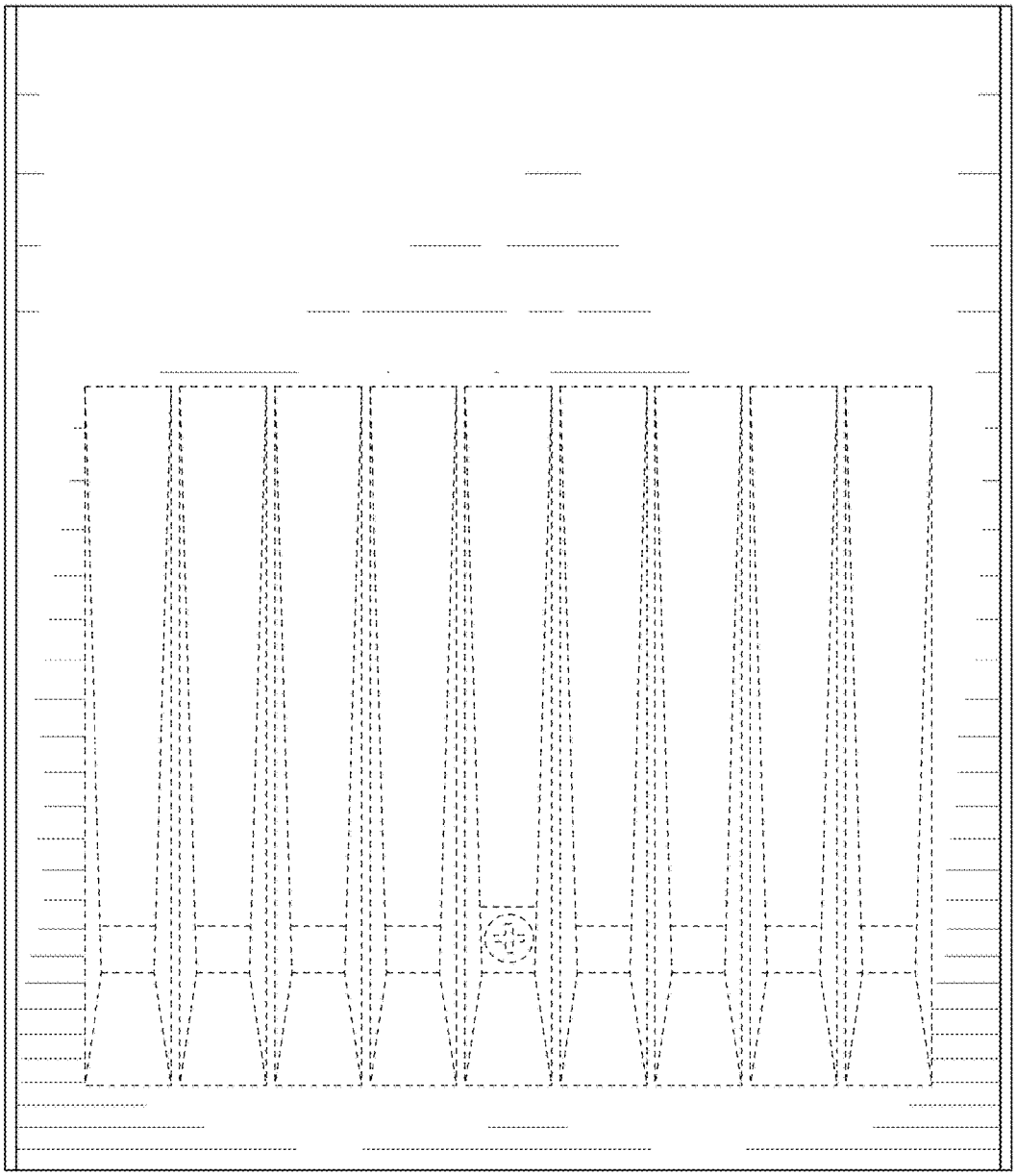

Matter enclosed in heavy brackets [ ] appears in the original patent but forms no part of this reissue; matter printed in italics indicates the additions made by reissue.

AMENDED

AMENDED

Related U.S. Application Data application for the reissue of Pat. No. Des. 668,810, which is a continuation of application No. 29/389,912, filed on Apr. 18, 2011, now Pat. No. Des. 650,112.

(58) Field of Classification Search
CPC .. F21S 8/003; F21V 1/18; F21V 8/003; F21V 8/024
See application file for complete search history.

(56) References Cited

U.S. PATENT DOCUMENTS

| | | | | | |
|---|---|---|---|---|---|
| D203,060 | S | | 11/1965 | Schaefer | |
| 3,263,071 | A | | 7/1966 | Fabbri | |
| D228,667 | S | | 10/1973 | Anderson | |
| D248,184 | S | | 6/1978 | Roberts | |
| D285,258 | S | | 8/1986 | Hamasaki | |
| D287,646 | S | | 1/1987 | Ayukawa | |
| D289,087 | S | | 3/1987 | Kobata | |
| D380,853 | S | | 7/1997 | Johnson | |
| D415,305 | S | | 10/1999 | Putman | |
| D421,816 | S | | 3/2000 | Gongora et al. | |
| D456,932 | S | | 5/2002 | Crosby | |
| D465,050 | S | | 10/2002 | Crelin | |
| D499,834 | S | | 12/2004 | Yu et al. | |
| D527,134 | S | | 8/2006 | Bagen | |
| D544,991 | S | | 6/2007 | Guercio | |
| D553,789 | S | * | 10/2007 | Akinrele | D26/118 |
| D562,491 | S | * | 2/2008 | DiCola | D26/85 |
| D574,995 | S | | 8/2008 | Boyer | |
| D577,146 | S | * | 9/2008 | Haugaard | D26/118 |
| D579,141 | S | | 10/2008 | Guercio | |
| D579,144 | S | | 10/2008 | Wnek et al. | |
| D590,088 | S | * | 4/2009 | Dworschak | D26/85 |
| D590,983 | S | * | 4/2009 | Sabernig | D26/85 |
| D595,447 | S | * | 6/2009 | Purcell | D26/85 |
| D608,040 | S | | 1/2010 | Guercio | |
| D609,387 | S | * | 2/2010 | Compton | D26/85 |
| D610,296 | S | * | 2/2010 | Boissevain et al. | D26/85 |
| D612,975 | S | * | 3/2010 | Guercio et al. | D26/85 |
| D617,491 | S | * | 6/2010 | Dordoni | D26/85 |
| D626,271 | S | | 10/2010 | Verelst | |
| D634,873 | S | | 3/2011 | Guercio | |
| D634,878 | S | | 3/2011 | Guercio et al. | |
| D643,147 | S | * | 8/2011 | Guercio | D26/118 |
| D643,571 | S | | 8/2011 | Chen | |
| D644,370 | S | * | 8/2011 | Lickiss | D26/85 |
| D647,662 | S | * | 10/2011 | Verelst et al. | D26/85 |
| D650,112 | S | * | 12/2011 | Bryant | D26/85 |
| D653,377 | S | | 1/2012 | Guercio | |
| D658,803 | S | | 5/2012 | Maxik et al. | |
| D659,895 | S | * | 5/2012 | Maxik | D26/118 |
| D678,596 | S | | 3/2013 | Bryant | |
| D691,320 | S | * | 10/2013 | Guercio | D26/118 |
| D695,445 | S | | 12/2013 | Panchisin et al. | |
| D698,986 | S | | 2/2014 | Reynolds | |
| D699,386 | S | | 2/2014 | Park et al. | |
| D699,887 | S | | 2/2014 | Chen | |
| D707,385 | S | | 6/2014 | Wardenburg et al. | |
| D714,992 | S | * | 10/2014 | Bryant | D26/118 |

OTHER PUBLICATIONS

Press Release, RAB Lighting, Feb. 9, 2010, RAB Lighting launches 20W LED Wallpack for out-door use.

RAB Lighting. WPLED52 Series Installation Instructions. P.1-2. www.rabweb.com; 2011; in Sep. 11, 2015 Office Action for U.S. Appl. No. 14/749,263.

RAB Lighting, The New LPACK52, Specification Sheet, in Sep. 11, 2015 Office Action for U.S. Appl. No. 14/749,263.

Press Release, RAB Lighting, Oct. 12, 2010, RAB LPACK13 Makes the Switch to LED Even Easier.

Press Release, RAB Lighting, Dec. 23, 2009, RAB Lighting Introduces new LED Wallpack.

* cited by examiner

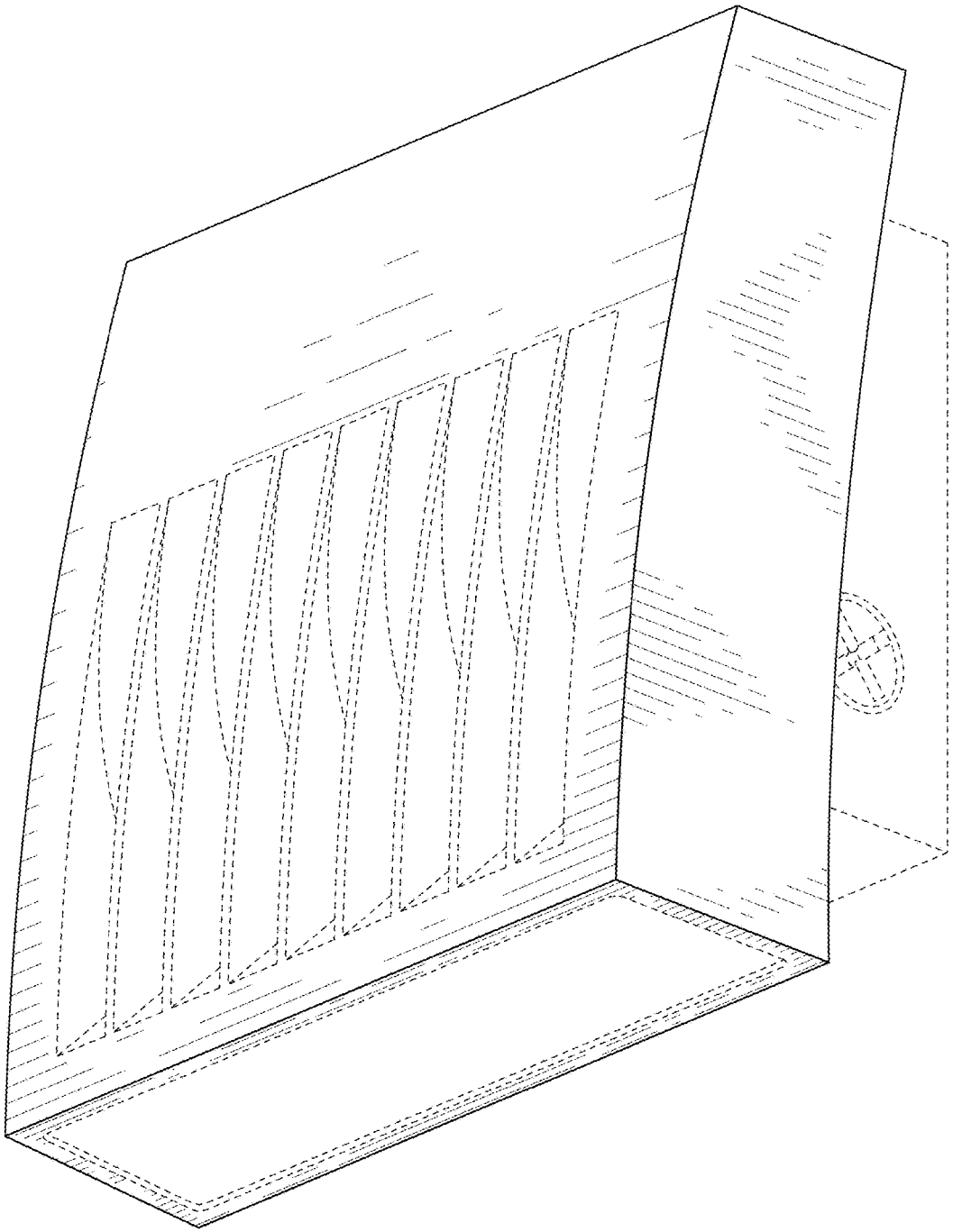
FIG. 1
AMENDED

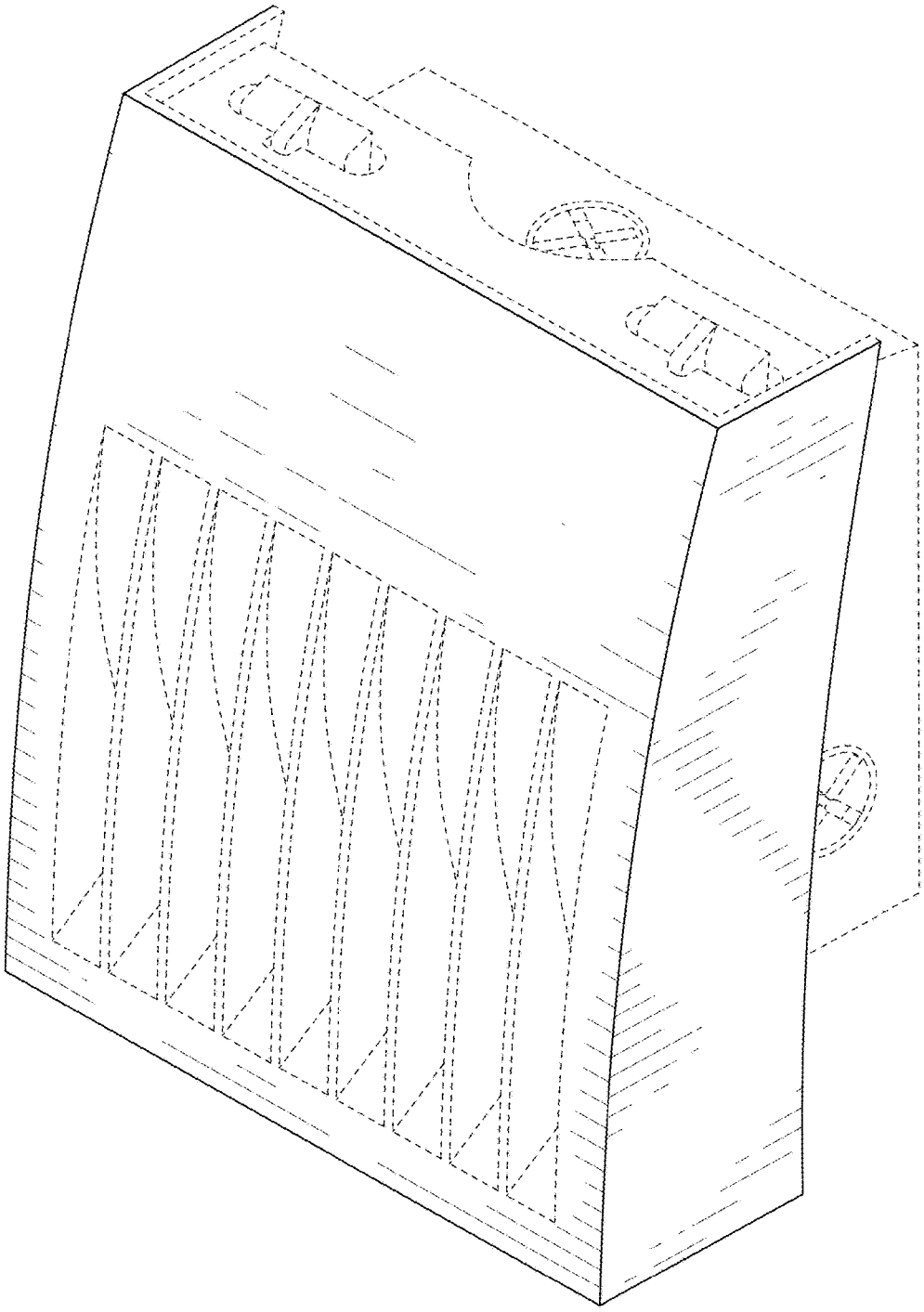
FIG. 2
AMENDED

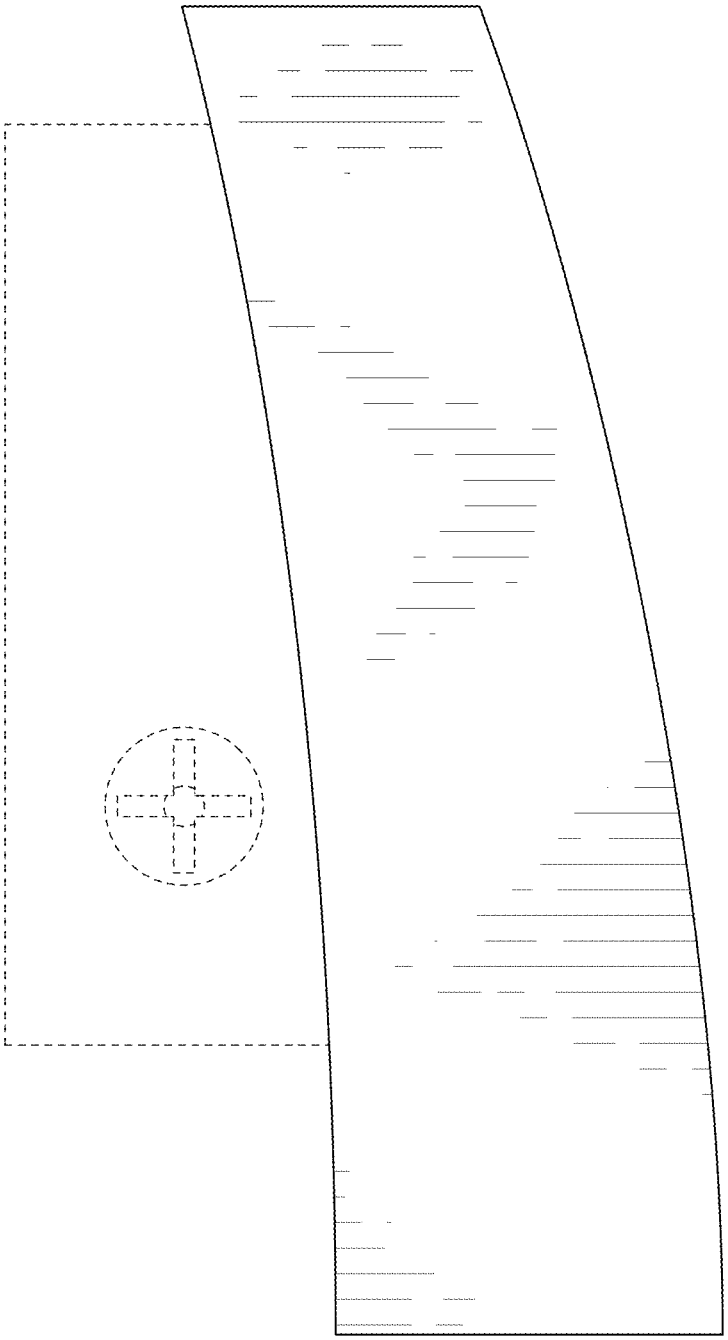
FIG. 4
AMENDED

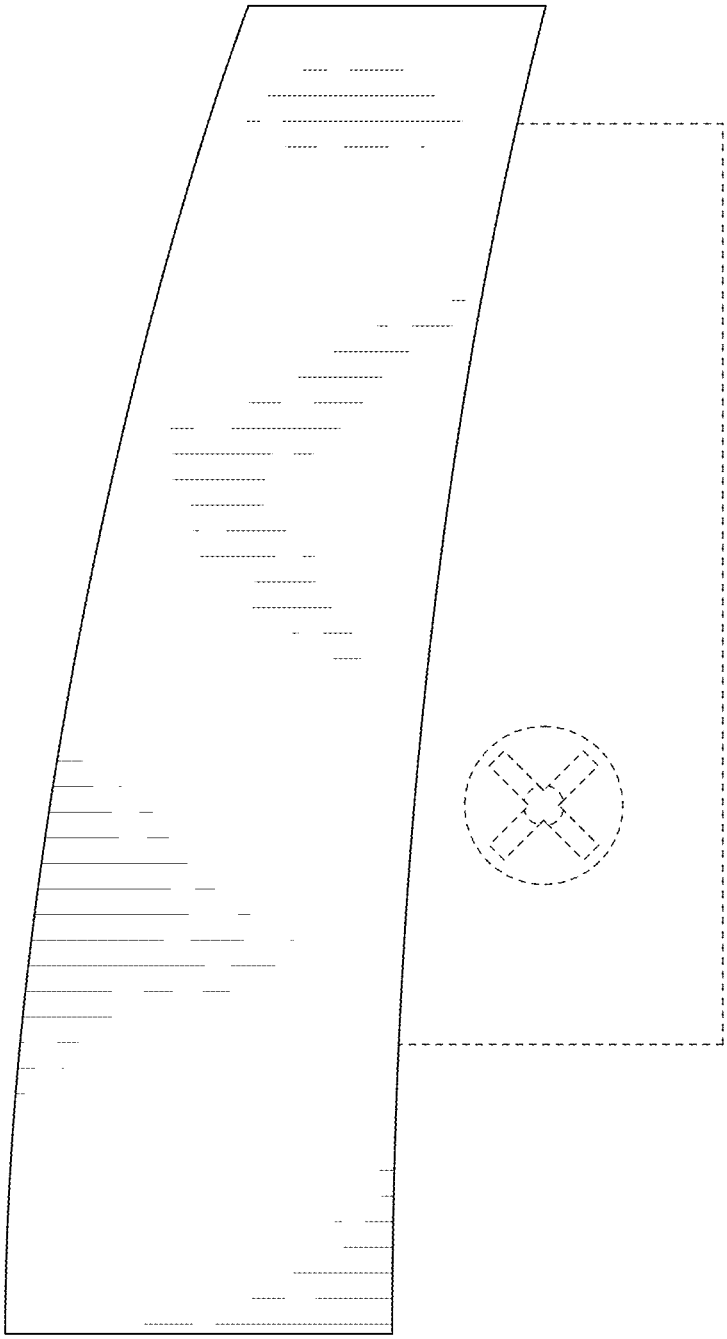
FIG. 5
AMENDED

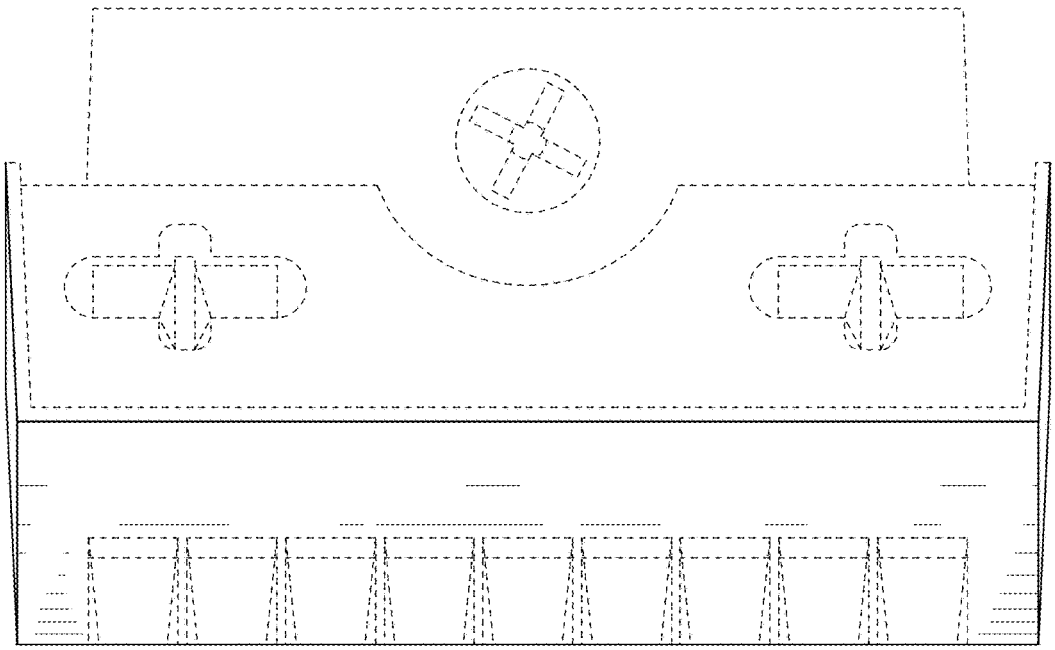
FIG. 6
AMENDED

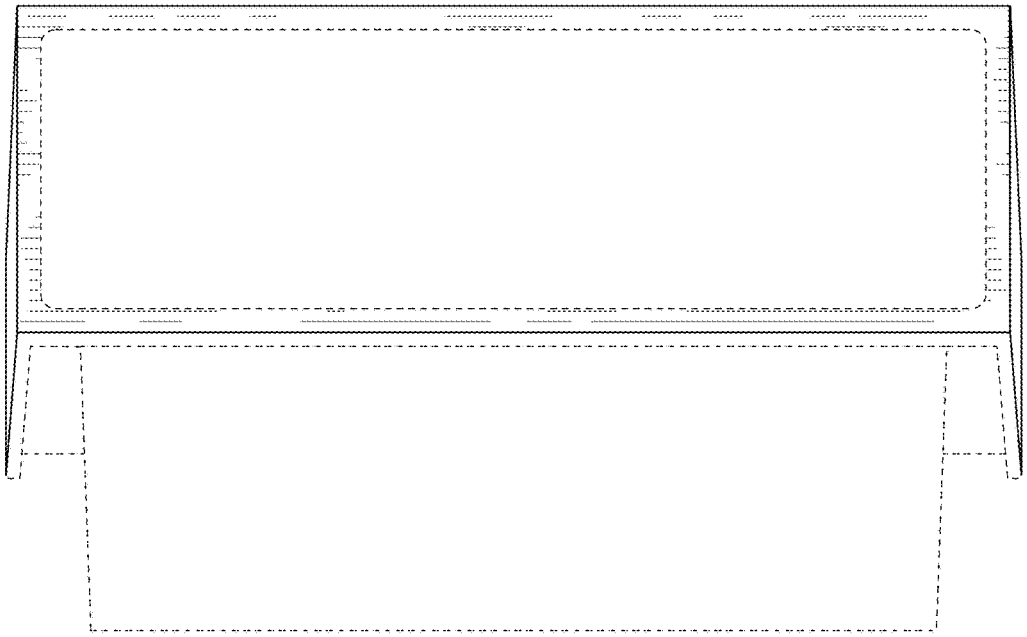
FIG. 7
AMENDED